United States Patent [19]
Rowles et al.

[11] Patent Number: 5,106,046
[45] Date of Patent: Apr. 21, 1992

[54] ADJUSTABLE MUG HOLDER

[75] Inventors: Donald R. Rowles, Flagstaff, Ariz.; Donald G. Rowles, Challis, Id.

[73] Assignee: Gridwest, Inc., Orange, Calif.

[21] Appl. No.: 646,438

[22] Filed: Jan. 28, 1991

[51] Int. Cl.⁵ .............................. F16M 13/00
[52] U.S. Cl. ........................ 248/311.2; 248/214; 248/231.4
[58] Field of Search .......... 248/311.2, 214, 297.3, 248/231.4, 316.4; 24/580, 581, 584, 585

[56] References Cited

U.S. PATENT DOCUMENTS

| 2,517,927 | 8/1950 | Reed | 248/231.4 X |
| 4,727,890 | 3/1988 | Vincent | 248/311.2 X |

FOREIGN PATENT DOCUMENTS

| 14938 | of 1893 | United Kingdom | 24/581 |
| 1342238 | 1/1974 | United Kingdom | 24/581 |

Primary Examiner—Alvin C. Chin-Shue
Attorney, Agent, or Firm—Marger, Johnson, McCollom & Stolowitz, Inc.

[57] ABSTRACT

An adjustable mug holder mountable on a vehicle door having different thicknesses of interior sidewall structures includes an inverted generally U-shaped mounting member connected to a side of a cup or mug receptacle which has a two-part base portion which is slidably adjustable over a predetermined range of widths. The mounting member has a free end sized for insertion between a window glass and an interior wall structure of the vehicle door to mount the holder on the wall structure. The base portion is formed by interdigitated channels and fingers in the first and second horizontal members connected to the receptacle and to the free end at approximately a right angle. The A series of holes in one of the channels and a mating post on the associated finger lock the first and second horizontal members in a selected position.

15 Claims, 1 Drawing Sheet

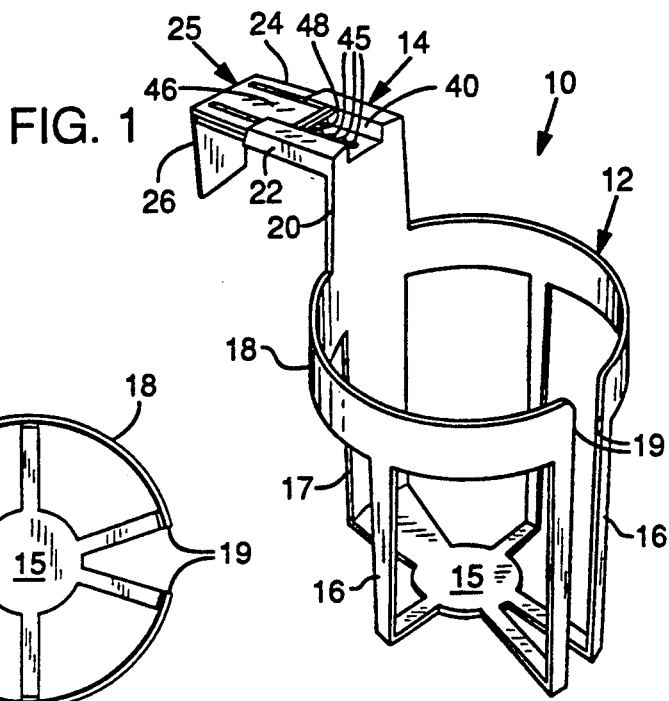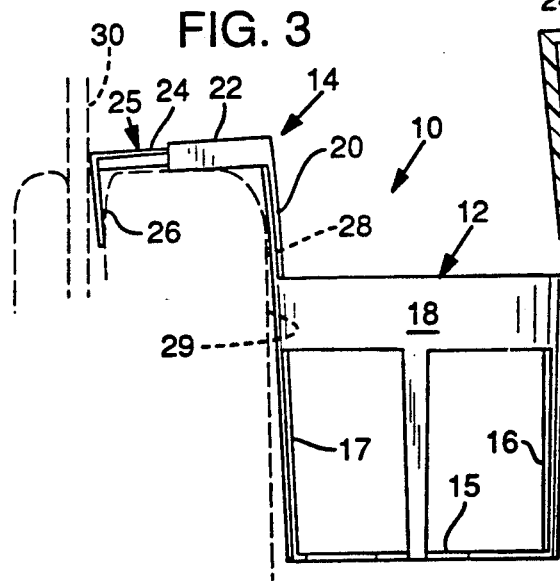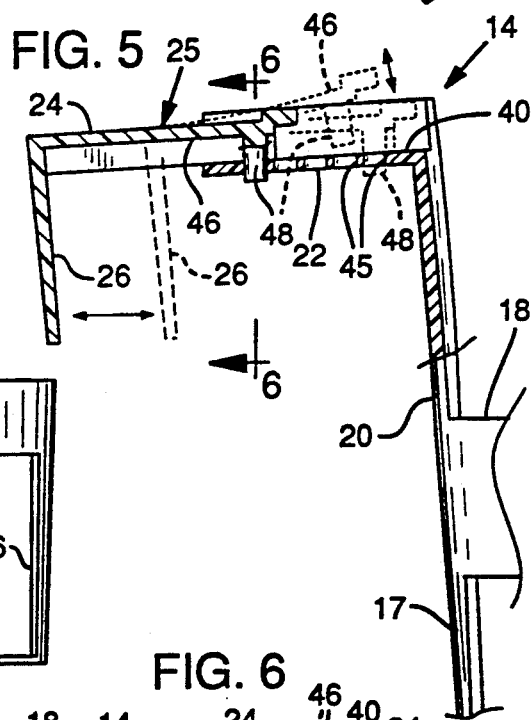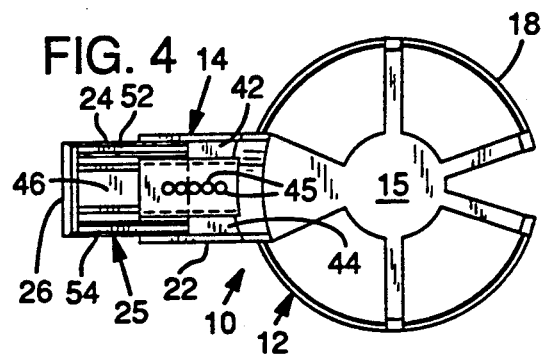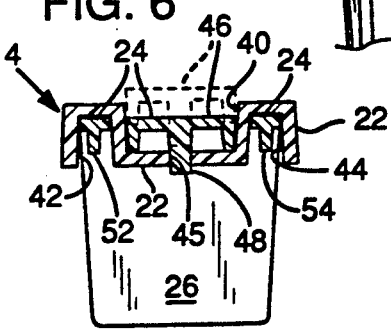

ADJUSTABLE MUG HOLDER

BACKGROUND OF THE INVENTION

This invention relates generally to holders for drinking cups and mugs and more particularly to mug and cup holders arranged to mount on the interior side of a vehicle door.

Cup holders are known which have a generally cylindrical receptacle for holding a cup or mug in an upright position and an inverted U-shaped attachment member for mounting the holder on a vehicle door by insertion of a free end of the U-shaped member between the window glass and interior door structure. Conventionally, the U-shaped attachment member is formed integrally with the receptacle, typically by injection molding the entire holder structure as a single unitary part. The attachment member thus has a fixed shaped and dimensions. Such mug holders are low cost items that must be made and sold in large volumes to do so profitably, and the injection molding tooling is very costly. Hence, the holders are typically made in a single one-size-fits-all model. Typical in this regard is car door mug holder shown in commonly-assigned U.S. design Pat. application Ser. No. 07/530,555, filed May 29, 1990.

The drawback of the prior forms of U-shaped attachment member is that the interior sidewall structure of vehicle doors varies in thickness. The mounting member must be of sufficient width to span this thickness. In typical examples of prior art mug holders, the U-shaped member is fixed to a single width in the range of 1¾ to 2". Such mug holders cannot be mounted on vehicle doors having an interior door structure of more than about 2" in thickness, as is the case in many vehicles. Conversely, a mounting member which would fit vehicles with a maximum thickness of interior door structure, e.g., approaching 3 inches, is wider than necessary for vehicle doors having a thinner interior door structure.

When mounted on vehicle doors of a thickness that matches the width of the U-shaped mounting member, the receptacle and a cup or mug of liquid received in it are supported by the interior surface of the door as well as by the mounting member. When the holder is mounted on a door with a much thinner interior wall structure, however, the receptacle and any cup or mug of liquid placed therein are unsupported by an abutting interior surface of the door structure. They must be supported in a cantilevered fashion by the U-shaped mounting member alone. This leads to a risk that the free-end of the mounting member may disengage from the window, particularly when a full, quart- or liter-sized cup is placed in the receptacle, spilling its contents over the user.

Accordingly, a need remains for a better form of cup and mug holder for mounting on the interior wall structure of a vehicle door.

SUMMARY OF THE INVENTION

One object of the invention is to improve upon the mounting structure heretofore used for mounting cup and mug holders atop the interior sidewall structure of a vehicle.

Another object is to enable mug holders of a single size to mount with stability on vehicle doors having interior sidewalls of a range of different thicknesses.

The invention is an adjustable mug holder mountable on a vehicle door having an inverted generally U-shaped mounting member connected to a side of the receptacle which is adjustable over a predetermined range to accommodate different thicknesses of interior sidewall structures. The holder includes a receptacle for supporting a cup or mug of liquid in an upright position. The mounting member has a free end sized for insertion between a window glass and an interior wall structure of the vehicle door to mount the holder on the wall structure. Adjustment means is provided in the mounting member for positioning the free end at a selected distance from the receptacle within a predetermined range of distances to define a width of the mounting member sufficient to span a thickness of the interior wall structure.

Preferably, the adjustment means includes a first horizontal member connected to the receptacle at approximately a right angle, a second horizontal member connected to the free end at approximately a right angle, and means for slidably interconnecting the first and second horizontal members. The slidably interconnecting means can further includes mean for locking the first and second horizontal members in a selected one of a plurality of positions to define said selected distance.

This arrangement permits a cup or mug to be mounted with stability, even in the case of quart or liter-sized containers, on a vehicle door having a wide range of thickness of interior wall structure. An advantage is that it enables use of a less rigid rear vertical member connecting the mounting member to the receptacle than in prior designs which had to be rigid enough for cantilevered support of the receptacle and its contents.

The foregoing and other objects, features and advantages of the invention will become more readily, apparent from the following detailed description of a preferred embodiment of the invention which proceeds with reference to the accompanying drawings.

BRIEF DESCRIPTION OF THE DRAWINGS

FIG. 1 is a perspective view of a cup and mug holder which includes an adjustable door-mounting structure in accordance with the invention.

FIG. 2 is a top plan view of the holder of FIG. 1.

FIG. 3 is a side elevation view of the holder of FIG. 1 shown positioned on the interior sidewall of a vehicle door, shown in dashed lines.

FIG. 4 is a bottom plan view of the holder of FIG. 1.

FIG. 5 is an enlarged cross-sectional view taken along lines 5—5 in FIG. 2, with various positions of the adjustable locking arm shown in dashed lines.

FIG. 6 is a cross-sectional view taken along lines 6—6 in FIG. 5.

DETAILED DESCRIPTION

FIGS. 1 and 2 show an improved, adjustable mug holder 10 according to the invention. The mug holder includes a receptacle 12 and an adjustable mounting member 14. The preferred form of receptacle 12, as shown herein, is essentially the same design as that disclosed and claimed in U.S. design Pat. application Ser. No. 07/530,555, but can take other forms as is well known in the art. The receptacle has a base 15, four narrow vertical members 16 spaced around the sides and front of the receptacle and a wide rear vertical member 17. All of the vertical members are interconnected by a top ring 18 having a vertical slot 19 between two of members 16 at the front of the receptacle for receiving the handle of a mug.

The adjustable U-shaped mounting member 14 includes a vertical portion 20 and a first horizontal base member 22 extending outward at approximately a right angle to vertical portion 20. Portion 20 and member 22 are formed integrally with the receptacle in vertical alignment with the rear vertical member 17. The mounting member includes a slidable member, designated generally by reference numeral 25, which provides a second horizontal base member 24 and a free end portion 26 approximately perpendicular to member 24. As further discussed below, member 24 is engaged with and horizontally slidable along member. Member 25 is formed as a unit separately from the rest of mug holder 10.

Referring to FIG. 3, member 25 is slidable in member 22 to adjust the width of the mounting member 4 as measured between vertical member 20 and free end 26. In use, the free end 26 is positioned so that the width of the U-shaped mounting member 14 just spans the thickness of the interior door structure 28 when free end 26 is inserted between the interior door structure and the window glass 30. This arrangement allows a single mug holder 10 to be adjusted throughout a predetermined range of widths for example from 1¾ to 2⅛. This permits the receptacle portion 12 of the holder to rest against the interior surface 29 of the vehicle door to stabilize and aid in support of cup or mug full of liquid received in the receptacle portion 12.

Referring to FIGS. 4-6, members 22 and 24 are molded to provide a mutually slidable and interlocking structure and operation. Member 22 is formed with a central, upward-facing channel 40 bordered on each side by a pair of walls which are formed to define a pair of downward-facing channels 42, 44. A series of holes 45 are spaced along the center bottom of channel 40. Slidable member 24 is formed in complementary fashion with a central tongue member 46 sized to be received between the sidewalls of channel 40 and having a central post 48 sized and centered to fit into holes 45 as shown in FIGS. 5 and 6. Tongue member 46 is formed in a inverted U-shaped channel shape which nests within channel 40. Spaced on opposite sides of tongue member 46 are a pair of guide members or fingers 52, 54 which are positioned to be received in slidable relationship in channels 42, 44, respectively. Members 52, 54 have a T-shaped cross section. When engaged in channels 40, 42, 44, the tongue members 46 and fingers 52, 54 engage in slidable interdigitated fashion.

Preferably, the receptacle structure 12 and portions 20, 22 of the mounting member 14 are formed as a unit by injection molding of resilient plastic in a mold arranged so that opposite upper and lower sides of the channel structures 40, 42, 44 are in opposite halves of the mold. Likewise, the slidable member 25 is formed so that post 45 is formed in one half of the mold therefor and is slightly tapered for easy removal from the mold half.

In use, the adjustable mounting assembly 14 is adjusted by the user raising tongue 14 upward from channel 40, to remove post 48 from hole 45. Then member 25 is slid toward or away from member 20 to adjust the combined overlapping length of base members 22, 24, and thereby the width between members 20 and 26, to match the thickness of interior door structure 28 of the vehicle in which the mug holder 10 is to be used. Once the proper width is attained, tongue 46 is released into channel 40, allowing post 48 to be biased by the resiliency of tongue 46 downward into one of holes 45. The user can push tongue 46 down in channel 40, taking advantage of the taper of post 48 to further engage and lock the post in hole 45.

The foregoing mug holder, made in a single size, can properly fit vehicle doors having an interior door structure 28 of a wide range of thicknesses, e.g., from 1½ to 3 inches. When the width of the mounting structure 14 is properly sized to the interior door structure, the receptacle and its contents are supported and stabilized by the interior surface 29 of the vehicle door. Risk of spillage is thereby reduced.

Having described and illustrated the principles of the invention in a preferred embodiment thereof, it should be apparent that the invention can be modified in arrangement and detail without departing from such principles. For example, the tongue and finger members could be formed in the first horizontal slide member and the channels could be formed in the second member.

We claim all modifications and variation coming within the spirit and scope of the following claims:

1. An adjustable mug holder mountable on a vehicle door, comprising:
    a receptacle for supporting a cup or mug of liquid in an upright position, said receptacle having a generally vertical sidewall;
    a first horizontal member connected to the vertical sidewall of the receptacle at approximately a right angle with respect to the vertical sidewall;
    an L-shaped mounting arm including a second horizontal member and free end connected at approximately a right angle with respect to the second horizontal member;
    means for slidably interconnecting the first and second horizontal members to define an inverted generally U-shaped mounting member;
    the free end sized for insertion vertically between a window glass and an interior wall structure of the vehicle door to mount the holder on the wall structure;
    the first and second horizontal members having a combined length which is adjustable within a predetermined range by operation of slidably interconnecting means to define a range of widths of the free end from the receptacle of distances for spanning a thickness of the interior wall structure; and
    means for locking the first and second horizontal members in a selected one of a plurality of positions to define a selected width within said range, the first member including a pair of transversely spaced lengthwise-extending channels and the second member including a pair of transversely spaced lengthwise-extending fingers slidably interdigitated within the channels.

2. An adjustable mug holder according to claim 1 in which the mounting member is connected to the side of the receptacle in alignment with the side thereof so that the side of the receptacle can rest against an interior surface of the interior wall structure when the combined length of the first and second members ia adjusted to define a width just sufficient to span a thickness of the interior wall structure.

3. An adjustable mug holder according to claim 1 in which the first member includes a lengthwise-extending central channel and the second member includes a lengthwise extending tongue slidably nested in the central channel.

4. An adjustable mug holder according to claim 1 in which the first member includes a lengthwise-extending series of holes and the second member includes a post positioned to fit into each of the holes one at a time to interlock the first and second members in a selected lengthwise position.

5. An adjustable mug holder according to claim 4 in which the post is tapered so as to wedge in the second member when pressed into one of said holes.

6. An adjustable mug holder mountable on a vehicle door, comprising:
   a receptacle for supporting a cup or mug of liquid in an upright position, the receptacle having a generally vertical sidewall;
   a first horizontal member connected to the vertical sidewall of the receptacle at approximately a right angle with respect to the vertical sidewall;
   an L-shaped mounting arm including a second horizontal member and a free end connected at approximately a right angle with respect to the second horizontal member; and
   means for slidably interconnecting the first and second horizontal members to define an inverted generally U-shaped mounting member;
   the free end sized for insertion vertically between a window glass and an interior wall structure of the vehicle door to mount the holder on the wall structure;
   the first and second horizontal members having a combined length which is adjustable within a predetermined range by operation of the slidably interconnecting means to define a range of widths of the free end from the receptacle of distances for spanning a thickness of the interior wall structure;
   the first horizontal member including a lengthwise-extending upward-facing central channel and a pair of transversely spaced downward-facing lengthwise-extending side channels; and
   the second horizontal member including a lengthwise-extending tongue slidably nested in the central channel and a pair of transversely spaced lengthwise-extending fingers slidably interdigitated within the side channels.

7. An adjustable mug holder according to claim 7 in which the first member includes a lengthwise-extending series of holes and the second member is formed of a resilient material and includes a post positioned to fit into each of the holes one at a time to interlock the first and second members in a selected lengthwise position.

8. An adjustable mug holder according to claim 7 in which the post is tapered so as to wedge in the second member when pressed into one of said holes.

9. A method for securely mounting a mug holder on an interior wall structure of a vehicle door, the interior wall structure having a range of thicknesses, the method comprising:
   forming a receptacle for supporting a cup or mug of liquid in an upright position;
   forming integrally on a vertical sidewall of the receptacle a first horizontal member having a lengthwise-extending channel on each of an upper and lower side thereof at approximately a right angle with respect to the vertical sidewall;
   forming a lengthwise-extending portion sized to slidably nest within each of the channels integrally connected to a free end at approximately a right angle with respect to the second horizontal member;
   slidably interconnecting the first and second horizontal members to define an inverted generally U-shaped mounting member; and
   spacing the free end of the mounting member at a selected distance from a side of the receptacle sufficient to span the thickness of the interior wall structure by slidably positioning the two mutually slidably members relative to one another.

10. A method according to claim 9 including interlocking the first and second horizontal members in a selected one of a plurality of positions to define said selected distance.

11. A method according to claim 9 in which spacing the free end of the mounting member at a selected distance from a side of the receptacle includes mutually sliding the first and second horizontal members to a combined length just sufficient to span a thickness of the interior wall structure of the vehicle door.

12. A method according to claim 9 in which the step of forming a first horizontal member comprises the step of forming a lengthwise-extending upward-facing central channel and a pair of transversely spaced downward-facing lengthwise-extending side channels in the first horizontal member and in which the step of forming a separate slider portion comprises the step of forming the second horizontal member with a length-wise extending tongue slidably nested in the central channel and a pair of transversely spaced lengthwise-extending fingers slidably interdigitated within the side channels.

13. A method according to claim 9 including forming a lengthwise-extending series of holes in a selected one of said channels and forming a post in the lengthwise-extending portion which is received in the selected channel in position for the post to fit into each hole for interlocking the first and second members.

14. A method according to claim 13 including the step of tapering the post so as to wedge in the second member when pressed into one of said holes.

15. A method according to claim 9 in which the forming steps are performed by injection molding, the channels being arranged to enclose each lengthwise-extending portion on only three sides.

* * * * *

UNITED STATES PATENT AND TRADEMARK OFFICE
CERTIFICATE OF CORRECTION

PATENT NO. : 5,106,046
DATED : April 21, 1992
INVENTOR(S) : Rowles et al

It is certified that error appears in the above-identified patent and that said Letters Patent is hereby corrected as shown below:

Column 2    Line 36, change "readily," to --readily--;

Column 3    Line 18, change "4" to --14--;

Column 4    Claim 2, Line 61, change "ia" to --is--;

Column 6    Claim 9, Line 10, after "forming" insert --a separate slider portion comprising a second horizontal member having--;

Column 6    Claim 9, Line 22, change "slidably" to --slidable--.

Signed and Sealed this

Twelfth Day of October, 1993

Attest:

BRUCE LEHMAN

Attesting Officer     Commissioner of Patents and Trademarks